United States Patent
Hsiao

[11] Patent Number: 6,099,150
[45] Date of Patent: Aug. 8, 2000

[54] BRAKE LIGHT SYSTEM FOR BICYCLES

[76] Inventor: Jun Lun Hsiao, P.O. Box 82-144, Taipei, Taiwan

[21] Appl. No.: 08/968,573

[22] Filed: Nov. 12, 1997

[51] Int. Cl.⁷ ........................................................ B62J 5/00
[52] U.S. Cl. ........................... 362/473; 362/802; 340/432
[58] Field of Search .................................... 362/473, 802; 340/134, 432

[56] References Cited

U.S. PATENT DOCUMENTS

| | | | |
|---|---|---|---|
| 3,878,387 | 4/1975 | Kovacic | 362/473 |
| 5,175,528 | 12/1992 | Choi et al. | 340/432 |

FOREIGN PATENT DOCUMENTS

| | | | |
|---|---|---|---|
| 2098309 | 11/1982 | United Kingdom | 340/432 |

Primary Examiner—Sandra O'Shea
Assistant Examiner—Todd Reed Hopper
Attorney, Agent, or Firm—A & J

[57] ABSTRACT

A brake light system for bicycles includes a light means fixedly mounted on a bicycle and a pair of brake assemblies each having a metallic bracket, a insulating rubber member mounted on the first metallic bracket, and a conductive rubber member mounted on the insulating rubber member, the metallic bracket being provided with a brake post extending outwardly to engage with one of the arms of a cantilever, the conductive rubber member being electrically connected with the light device via a electrical wire, whereby when the cantilever brake is activated, a braking signal will be transmitted to a controlling circuit through the conductive rubber member thereby turning on the light device.

1 Claim, 7 Drawing Sheets

BRAKE LIGHT SYSTEM FOR BICYCLES

CROSS-REFERENCE

This invention is related to the U.S. patent application Ser. No. 08/599,848, owned by the same applicant.

BACKGROUND OF THE INVENTION

1. Field of the Invention

This invention relates to an improved brake light system for bicycles.

2. Description of the Prior Art

It has been found that rear end vehicular collisions are one of the most common accidents occurring on our road systems today and results in countless loss of money, time, and sometimes, life to those involved. Hence, numerous structures are disclosed in the prior art which are operable in various complex manners to alert following drivers of a bicycle's deceleration by turning on a brake light mounted on the rear of the bicycle. However, such prior art structures are very complicated in nature, expensive to manufacture, and difficult to install. In fact, such devices are difficult to adjust thereby rendering them unfit for practical use.

In U.S. Pat. No. 4,586,021 to Nickols, a bicycle braking system indicator light assembly is disclosed. Such an assembly includes a battery powered lamp mounted on the rear of the bicycle. An electrical system is incorporated with the lamp which has a switch operatively connected with the caliper braking mechanism for the rear wheel of the bicycle so that the lamp is turned on and off in response to the operation of the brake mechanism. Once the brake blocks are worn out, it is necessary to adjust the assembly. However, it is difficult for an amateur to achieve the adjustment of the assembly hence making it unfeasible for popular uses.

UK Patent Application No. 2,098,309 to Hennessy discloses a bicycle braking indicator comprising light means installed on the conductive cycle frame, first and second brake blocks/electrically connected to the light means via wire. However, this reference utilizes a rotatable contact wheel made of conductive material to complete the circuit thereby making it very complicated in assembly and infeasible for use.

U.S. Pat. No. 4,792,882 to Guevremont teaches a bike brake light which comprises a brake light, a power supply for the brake light and a circuit opening and closing arrangement. The circuit opening and closing arrangement utilizes a microswitch to operate the brake light. Nevertheless, as the previous U.S. Pat. No. 4,586,021, this reference is still difficult to be adjusted once the brake blocks are worn out. Further, the bike brake light is also complicated in structure.

Another bicycle brake light system is disclosed in U.S. Pat. No. 4,833,444. The bicycle brake light system utilizes a remote pressure actuable switch positionable on a bicycle frame for responding to the application of the brakes of the bicycle for actuation of the light. Anyhow, the bicycle brake light system still suffers from similar drawbacks of the previous U.S. Patents and is inconvenient to install.

U.S. Pat. No. 4,920,464 to Balentine, III, entitled "Bicycle Brake Light" discloses an arrangement which utilizes an included battery and signaling lamp mounted on an associated bicycle frame with a switch member mounted on a brake caliper to complete an electrical circuit to actuate the associated lamps. Likewise, this arrangement has to be regulated when the brake blocks are worn out and may create a hazard if it is not correctly adjusted.

Therefore, it is an object of the present invention to provide an brake light system which can obviate and mitigate the above-mentioned drawbacks.

SUMMARY OF THE INVENTION

This invention relates to an improved brake light system for bicycles.

It is the primary object of the present invention to provide a brake light system for bicycles which simple in construction.

It is another object of the present invention to provide a brake light system for bicycles which is low in cost.

It is still another object of the present invention to provide a brake light system for bicycles which is reliable in operation.

It is still another object of the present invention to provide a brake light system for bicycles which is easy to adjust.

It is a further object of the present invention to provide a brake light system for bicycles which can be readily installed on a bicycle.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 1:
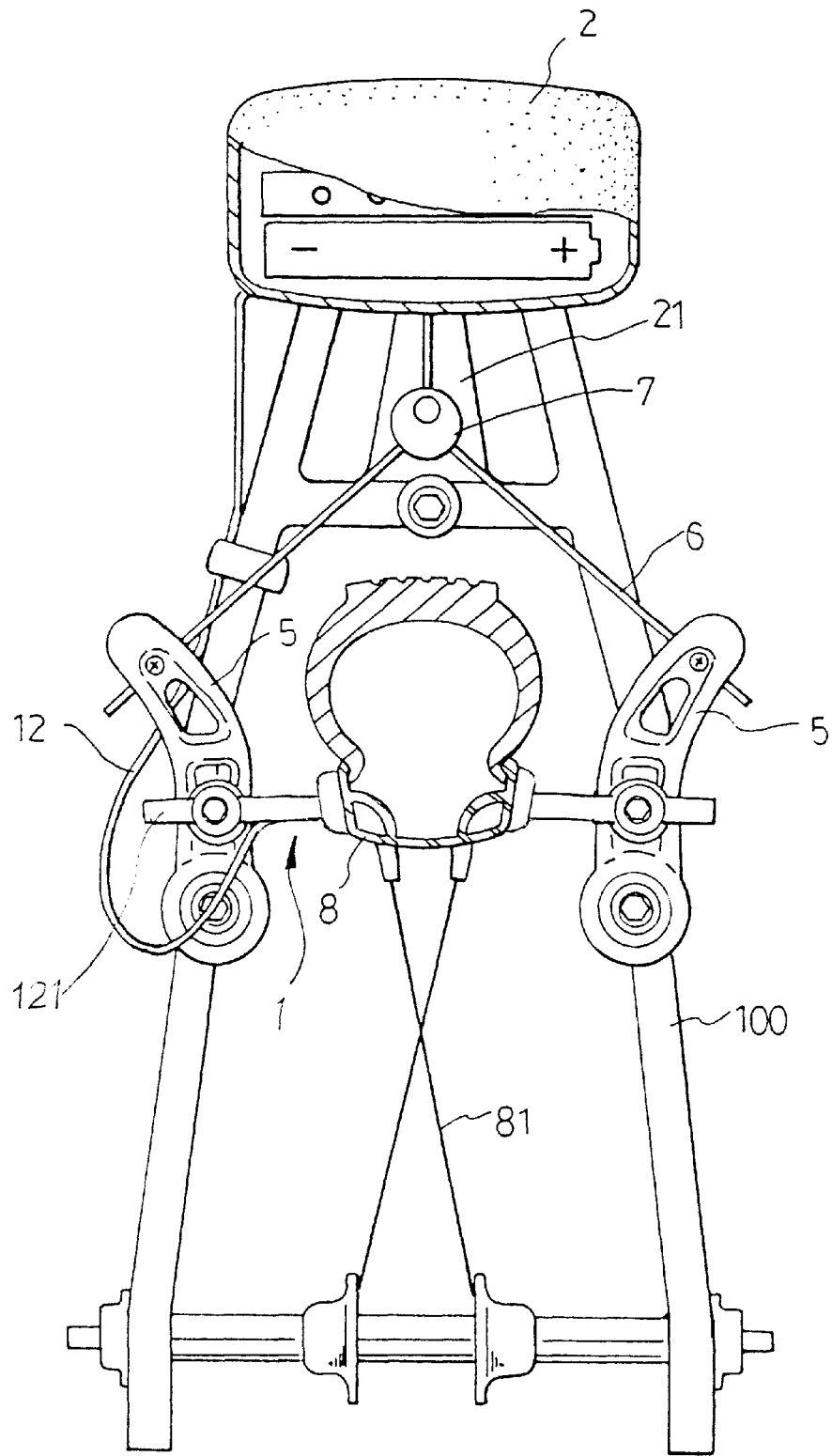
FIG. 1 illustrates a bicycle equipped with a brake light system for bicycles according to the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
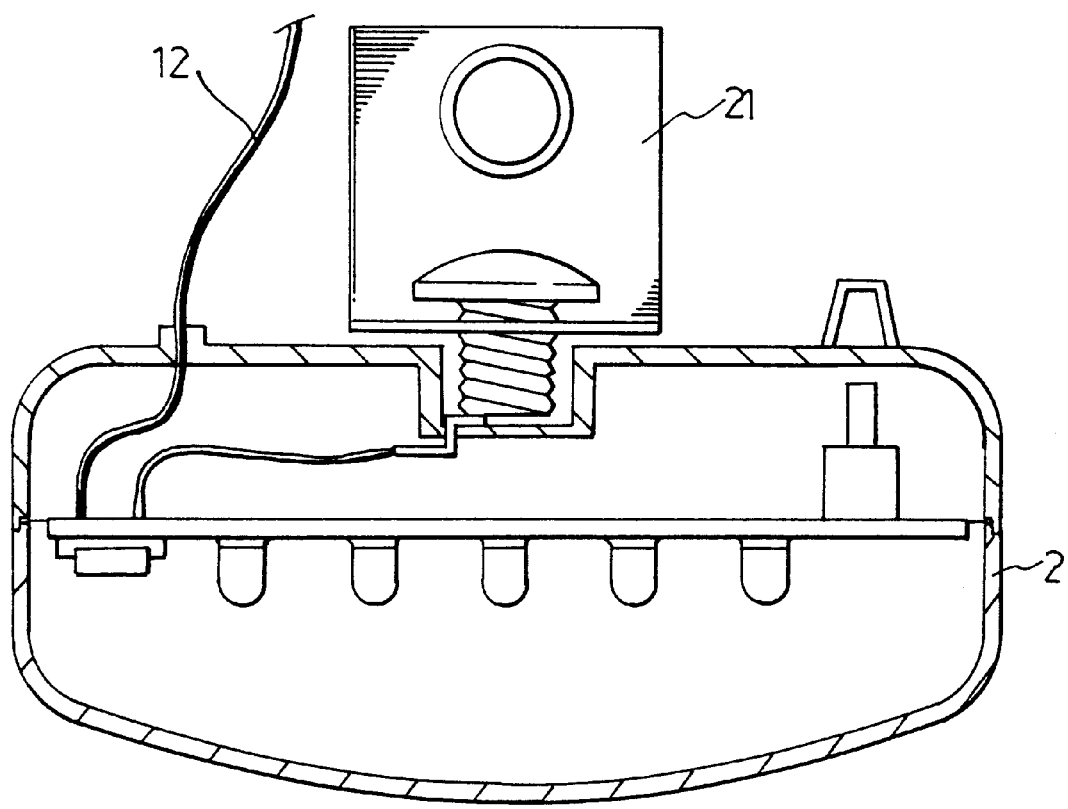
FIG. 2 is a side view of the bicycle shown in FIG. 1.

With reference to the drawings and in particular to FIGS. 1 and 2 thereof, the brake light system for bicycles according to the present invention generally comprises a pair of brake assemblies 1, a light means 2 and a controlling means 3.

As shown in FIGS. 1, 5, 6 and 7, the brake assembly 1 comprises a bracket 12 preferably made of metal, an insulating rubber member 13 mounted on the bracket 12, and a conductive rubber member 11 installed on the bracket 12. The bracket 12 is a T-shaped member provided with a brake post 121 extending downwardly (with respect to FIGS. 5, 6 and 7) from the intermediate portion of the bottom thereof.

The insulating rubber member 13 has an opening which goes through the central portion thereof and is formed with two pairs of webs 131 and 132. The bracket 12 is fitted in the insulating rubber member 13, with its bottom supported by the webs 131 and 132 and its brake post 121 extending downwardly through the insulating rubber member 13. The conductive rubber member 11 is fixedly mounted on the insulating rubber member 13 with its bottom in contact with the bracket 12. The conductive rubber member 11 is of a resistance of 5–50 Kohms and used for transmitting signals but not electric current. The brake post 121 is fixedly mounted on a brake arm 5 of a cantilever brake (shown but not numbered). The two brake arms 5 are connected to a straddle yoke 7 via a straddle wire 6. The straddle wire 6 is in turn connected to a brake lever (not shown). The brake lever may be of any conventional design well known to those skilled in the art and is not considered a part of the invention.

One of the conductive rubber members 1 is connected to a terminal (not shown) of the light means 2 via an electrical wire 120. The light means 2 is provided with a metal support 21 which is fixedly mounted on the frame 100 of a bicycle. The light means 2 has a circuit having two terminals and will be turned on when the two terminals are electrically connected together. The metal support 21 is electrically connected to the other terminal (not shown) of the light means 2.

Figure 3:
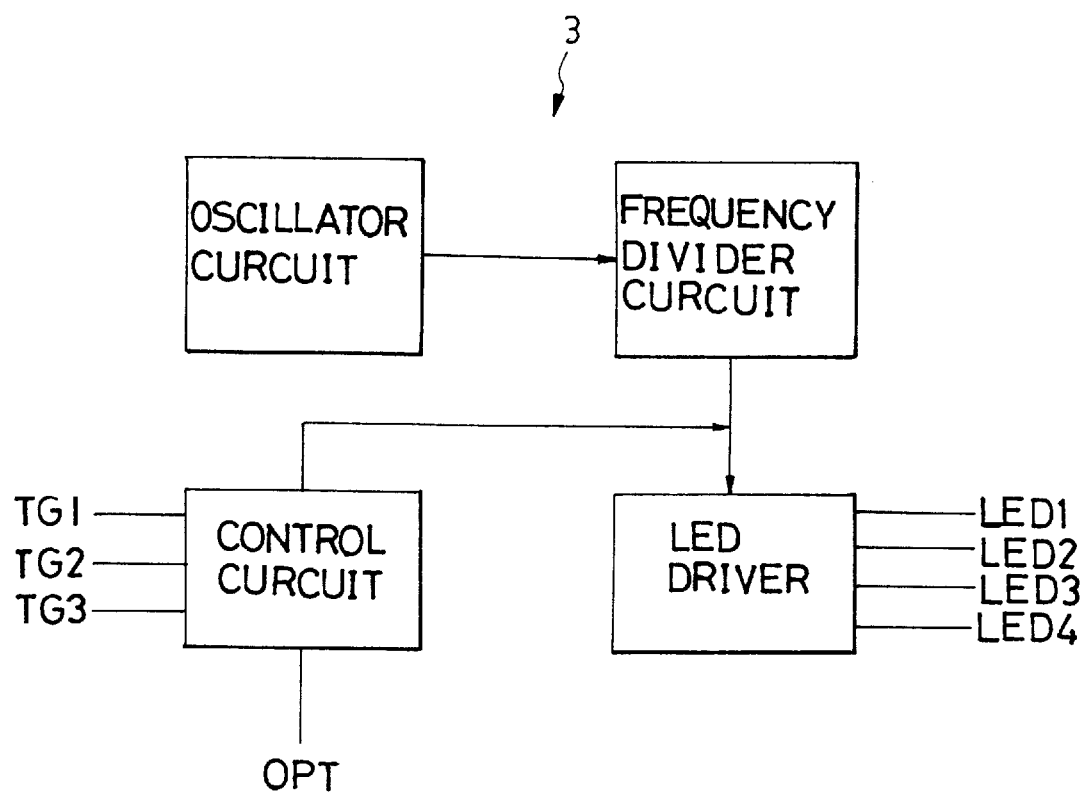
FIG. 3 is a sectional view of the light.
Figure 4:
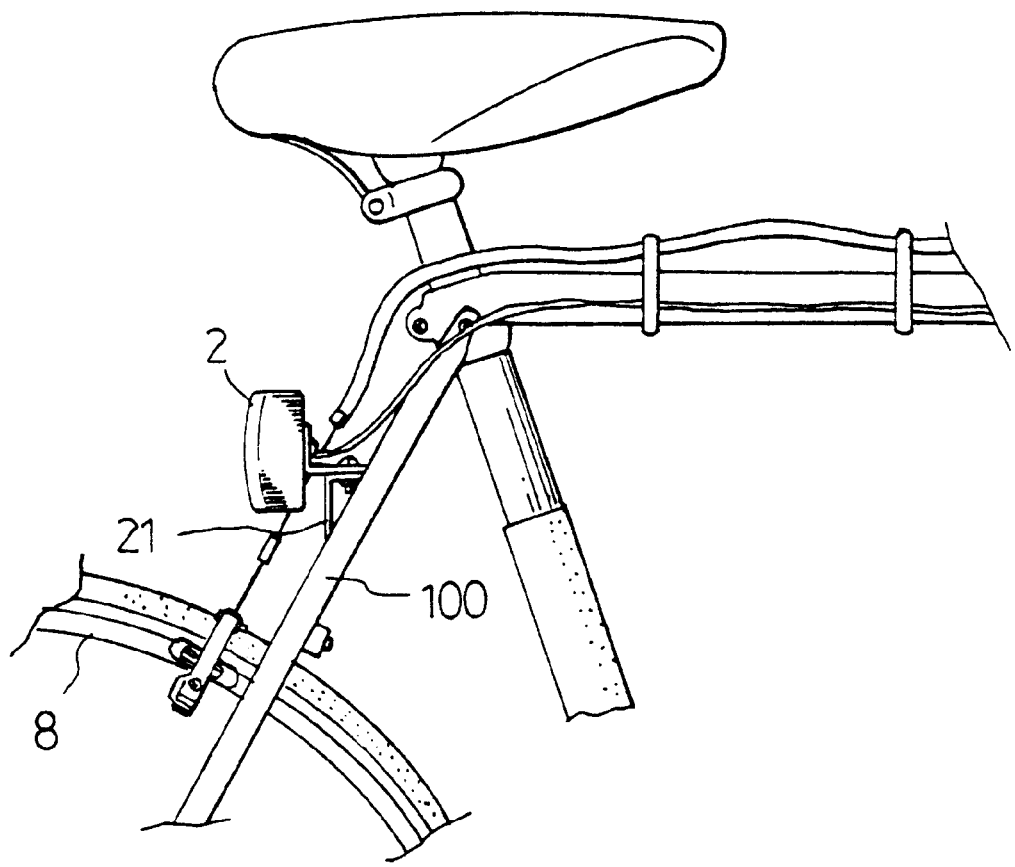
FIG. 4 is a block diagram of the means for controlling the light.
Figure 5:
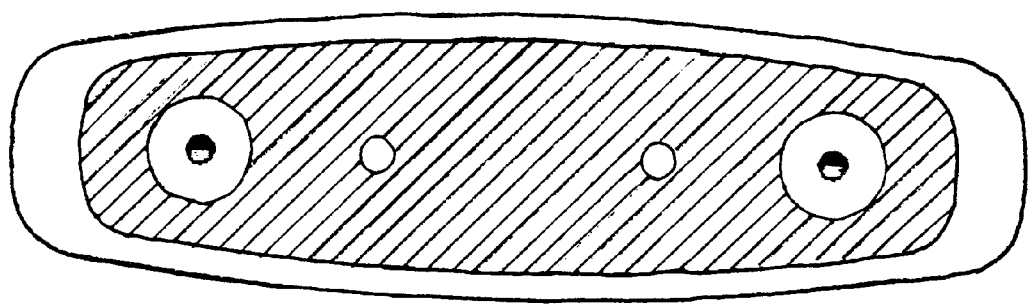
FIG. 5 is a top view of the brake assembly.
Figure 6:
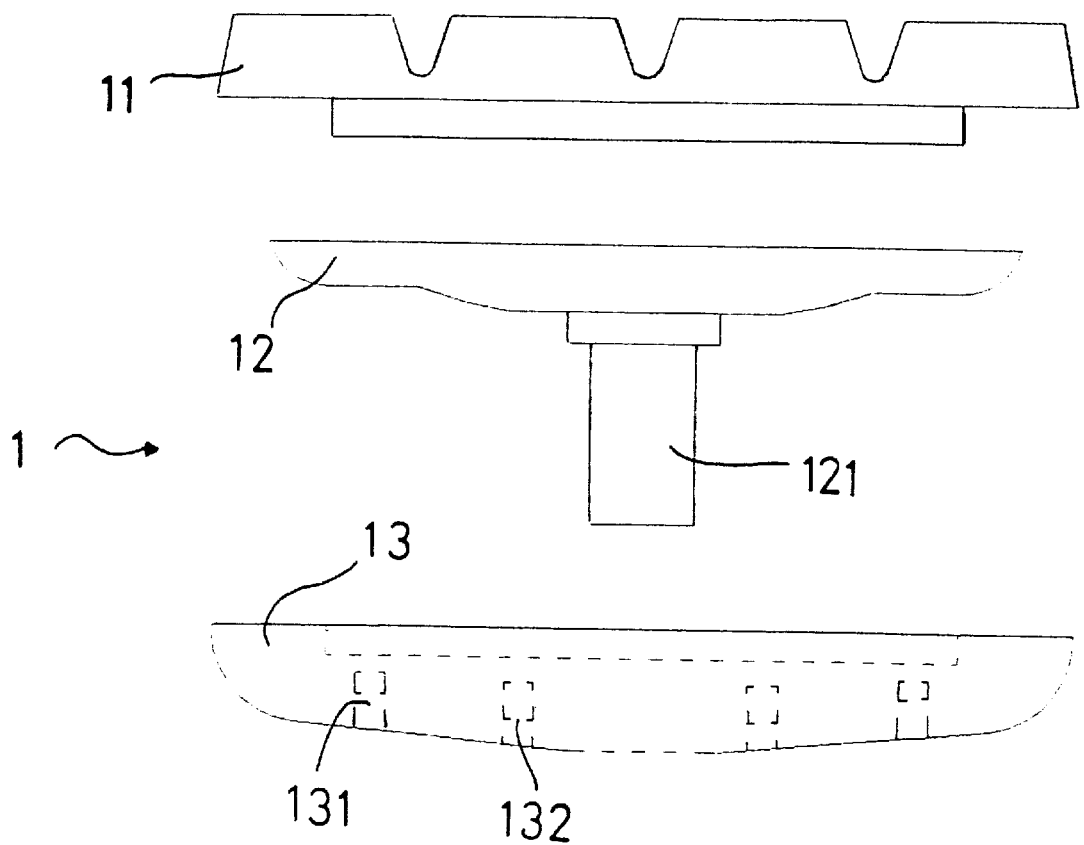
FIG. 6 is an exploded view of the brake assembly.
Figure 7:
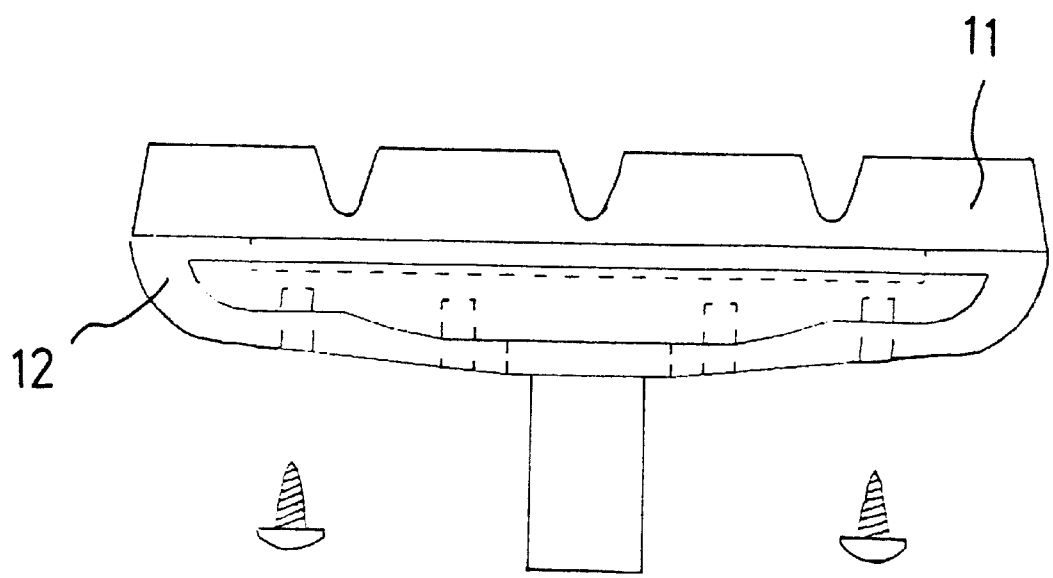
FIG. 7 is a front view of the brake assembly.

The light means 2 is provided with a controlling means 3 (see FIG. 3) so that the lamp 2 will give steady light or blink at preset modes as desired. Furthermore, no matter whether the lamp 2 is turned off or turned on to give steady light or blink at any modes, the lamp 2 will give brighter steady light. The controlling means 3 may be any of any conventional design well known to those skilled in the art and is not considered a part of the invention.

When the brake lever (not shown) is pressed to apply brake, the brake arms 5 will be rotated to press the brake blocks 1 against the metallic wheel rim 8 thereby reducing speed or stopping motion of the bicycle. In the meantime, the conductive rubber members 1 are in contact with the metallic wheel rim 8, so that the light means 2, the electrical wire 120, the conductive rubber members 11, the metallic wheel rim 8, the spokes 81, the frame 100 and the metal mount 21 form a closed circuit thereby enabling a braking signal to be transmitted from the conductive rubber member 11 to a controlling means 3 (see FIG. 3) to turn on the light means 2.

Furthermore, a legend "CAUTION", "STOP" or the like (not shown) may be applied to the lens of the lamp 2, as desired.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. In a bicycle including a metal frame and two metal wheel rims, a brake light system and a cantilever brake provided with a pair of arms, said brake light system comprising:

a light means fixedly and electrically connected with a metal mount which is in turn installed on said metal frame;

a first brake assembly including a first metallic bracket, a first insulating rubber member mounted on said first metallic bracket, and a first conductive rubber member mounted on said first insulating rubber member, said first metallic bracket being provided with a first brake post extending outwardly to engage with one of said arms, said first conductive rubber member being electrically connected with said light means via a first electrical wire;

a second brake assembly including a second metallic bracket, a second insulating rubber member mounted on said second metallic bracket, and a second conductive rubber member mounted on said second insulating rubber member, said second metallic bracket being provided with a second brake post extending outwardly to engage with another one of said arms, said conductive rubber members being of a resistance of 5–50K ohms.

* * * * *